(12) United States Patent
Newham et al.

(10) Patent No.: US 10,303,235 B2
(45) Date of Patent: May 28, 2019

(54) SYSTEMS AND METHODS FOR IMPLEMENTING POWER COLLAPSE IN A MEMORY

(71) Applicant: QUALCOMM Incorporated, San Diego, CA (US)

(72) Inventors: Adam Edward Newham, Poway, CA (US); Kenneth David Easton, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 14/638,185

(22) Filed: Mar. 4, 2015

(65) Prior Publication Data
US 2016/0259398 A1 Sep. 8, 2016

(51) Int. Cl.
*G06F 1/32* (2019.01)
*G06F 1/3246* (2019.01)
(Continued)

(52) U.S. Cl.
CPC ............. *G06F 1/32* (2013.01); *G06F 1/3203* (2013.01); *G06F 1/3246* (2013.01);
(Continued)

(58) Field of Classification Search
CPC ........... G06F 3/0679; G06F 2212/1041; G06F 3/1292; G06F 3/0625; G06F 3/0653;
(Continued)

(56) References Cited

U.S. PATENT DOCUMENTS

| 6,874,027 B1 | 3/2005 | English |
| 7,369,815 B2 | 5/2008 | Kang et al. |

(Continued)

FOREIGN PATENT DOCUMENTS

| EP | 0811915 A1 | 12/1997 |
| EP | 1524597 A1 | 4/2005 |

(Continued)

OTHER PUBLICATIONS

International Search Report and Written Opinion—PCT/US2016/016751—ISA/EPO—dated Sep. 20, 2016.
(Continued)

*Primary Examiner* — Reginald G Bragdon
*Assistant Examiner* — Thanh D Vo
(74) *Attorney, Agent, or Firm* — Muncy, Geissler, Olds & Lowe, P.C.

(57) ABSTRACT

A power management system for stack memory thread tasks according to some examples of the disclosure may include a non-collapsible memory region, a collapsible memory region configured below the non-collapsible memory region, a memory management unit in communication with the non-collapsible memory region and the collapsible memory region, the memory management unit operable to allocate a portion of the non-collapsible memory region and a portion of the collapsible memory region to a thread task upon initialization of the thread task and power down the portion of the collapsible memory region allocated to the thread task upon receiving a power down command.

20 Claims, 5 Drawing Sheets

(51) Int. Cl.
  *G06F 1/3203* (2019.01)
  *G06F 1/3234* (2019.01)
  *G06F 1/3293* (2019.01)
  *G06F 12/02* (2006.01)
  *G06F 1/3287* (2019.01)

(52) U.S. Cl.
  CPC .......... *G06F 1/3275* (2013.01); *G06F 1/3293* (2013.01); *G06F 12/0246* (2013.01); *G06F 1/3287* (2013.01); *Y02D 10/13* (2018.01); *Y02D 10/14* (2018.01); *Y02D 10/171* (2018.01); *Y02D 50/20* (2018.01)

(58) Field of Classification Search
  CPC .............. G06F 9/5094; G06F 11/1446; G06F 13/1689; G06F 1/32; G06F 1/3275; G06F 1/3284; G06F 1/3287
  See application file for complete search history.

(56) References Cited

U.S. PATENT DOCUMENTS

| | | |
|---|---|---|
| 8,199,599 B2 | 6/2012 | Jeddeloh |
| 8,667,312 B2 | 3/2014 | Rajan et al. |
| 2005/0066305 A1 | 3/2005 | Lisanke |
| 2005/0198542 A1 | 9/2005 | Freker et al. |
| 2005/0206410 A1 | 9/2005 | Suh |
| 2006/0282694 A1* | 12/2006 | Ichikawa .............. G06F 1/3203 713/322 |
| 2006/0294520 A1 | 12/2006 | Anderson |
| 2007/0291571 A1* | 12/2007 | Balasundaram ......... G11C 5/14 365/227 |
| 2008/0195875 A1 | 8/2008 | Hobson |
| 2010/0058087 A1* | 3/2010 | Borras .................. G06F 1/3203 713/322 |
| 2010/0191999 A1 | 7/2010 | Jeddeloh |
| 2011/0231687 A1 | 9/2011 | Takeyama et al. |
| 2012/0072676 A1 | 3/2012 | Accapadi et al. |
| 2012/0144220 A1 | 6/2012 | Mearns |
| 2013/0103896 A1 | 4/2013 | Rajan et al. |
| 2013/0166866 A1 | 6/2013 | Yerushalmi et al. |
| 2013/0275661 A1* | 10/2013 | Zimmer .............. G06F 12/0246 711/103 |
| 2014/0075091 A1 | 3/2014 | Bartling et al. |
| 2014/0310552 A1 | 10/2014 | So et al. |

FOREIGN PATENT DOCUMENTS

| | | |
|---|---|---|
| EP | 2177990 A1 | 4/2010 |
| EP | 2416229 A2 | 2/2012 |
| JP | 2003122628 A | 4/2003 |

OTHER PUBLICATIONS

Partial International Search Report—PCT/US2016/016751—ISA/EPO—dated May 13, 2016.

* cited by examiner

SYSTEMS AND METHODS FOR IMPLEMENTING POWER COLLAPSE IN A MEMORY

FIELD OF DISCLOSURE

This disclosure relates generally to memories, and more specifically, but not exclusively, to memory power collapse.

BACKGROUND

When designing microprocessors, microcontrollers, or application specific integrated circuits such as System on Chips (SoCs) for low power applications, the power consumption of the system is an issue. To lessen the power consumption of a microcontroller or SoC system, it is desirable to be able to power down associated memory that is not being used in order to minimize transistor leakage and retention current consumed by the unused memory. However before this may be done, any software interacting with the memory must be in a state where powering down the memory will not have a detrimental effect. Accordingly, there are long-felt industry needs for methods that improve upon conventional methods including the improved methods and apparatus provided hereby.

The inventive features that are characteristic of the teachings, together with further features and advantages, are better understood from the detailed description and the accompanying figures. Each of the figures is provided for the purpose of illustration and description only, and does not limit the present teachings.

SUMMARY

The following presents a simplified summary relating to one or more aspects and/or examples associated with the apparatus and methods disclosed herein. As such, the summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

Some examples of the disclosure are directed to systems, apparatus, and methods for implementing a power collapse in a memory.

In some examples of the disclosure, the system, apparatus, and method for a power management system for thread tasks includes: a non-collapsible memory region; a collapsible memory region; a memory management unit in communication with the non-collapsible memory region and the collapsible memory region, the memory management unit operable to allocate a portion of the non-collapsible memory region and a portion of the collapsible memory region to a thread task upon initialization of the thread task, and the memory management unit is operable to power down the portion of the collapsible memory region allocated to the thread task upon receiving a power down command.

In some examples of the disclosure, a method of powering down a memory includes: partitioning a memory into a first region and a second region, the second region being a stack memory with associated thread tasks; receiving a power down command; and upon receiving a power down command, maintaining power to the first region and polling each associated thread task to determine if the second region associated with the thread task should be powered down or maintained.

In some examples of the disclosure, a non-transitory computer-readable memory to store instructions that when executed on a system cause the system to perform a process, the process including: partitioning a memory into a first region and a second region, the second region being a stack memory with associated thread tasks; receiving a power down command; and upon receiving a power down command, maintaining power to the first region and polling each associated thread task to determine if the second region associated with the associated thread task should be powered down or maintained.

Other features and advantages associated with the apparatus and methods disclosed herein will be apparent to those skilled in the art based on the accompanying drawings and detailed description.

BRIEF DESCRIPTION OF THE DRAWINGS

The accompanying drawings are presented to describe examples of the present teachings, and are not limiting. The accompanying drawings are presented to aid in the description of examples of the disclosure and are provided solely for illustration of the examples and not limitation thereof.

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
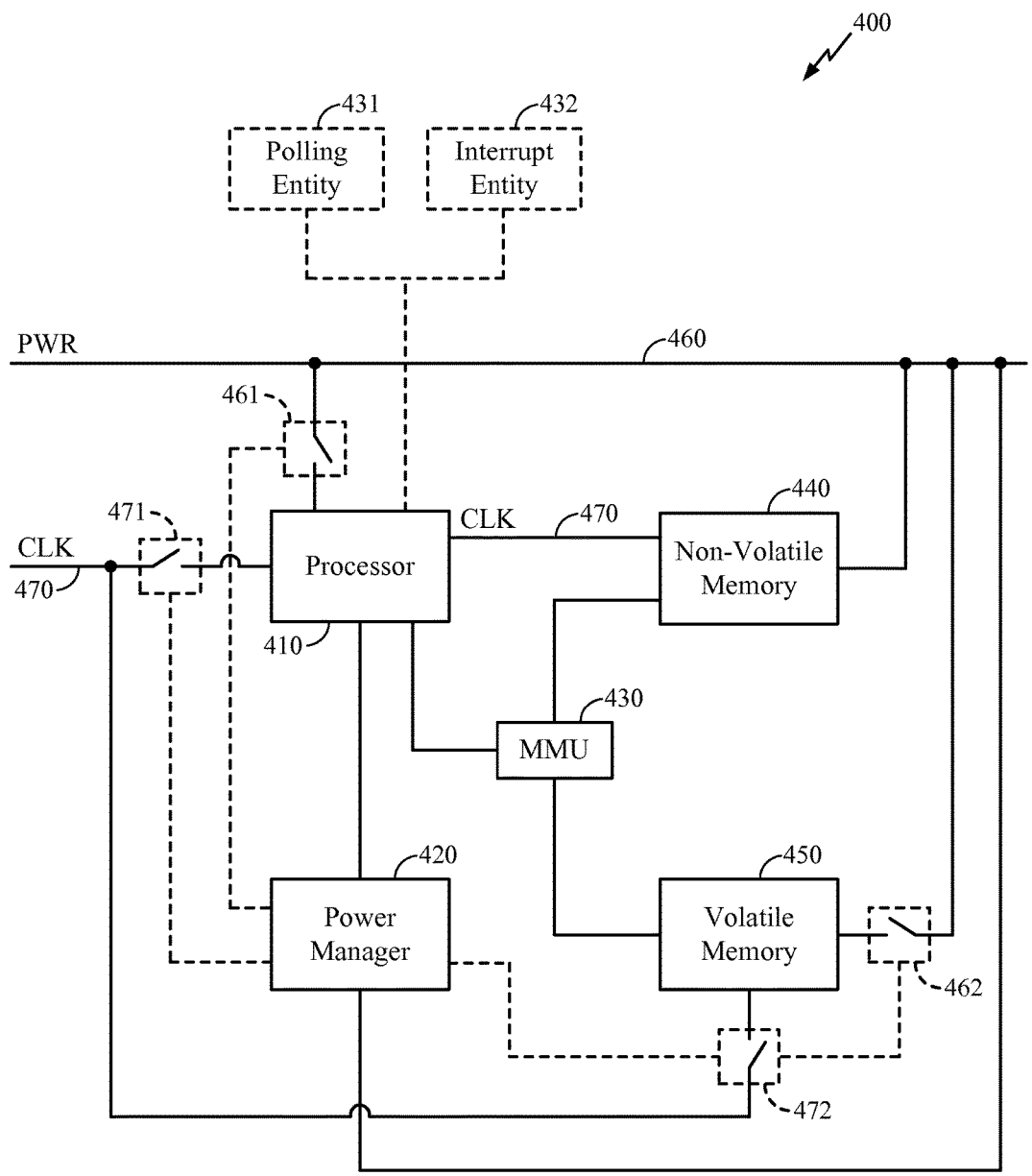
FIG. 1 illustrates an exemplary power management system according to some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Various aspects are disclosed in the following description and related drawings to show specific examples relating to the disclosure. Alternate examples will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and examples disclosed herein.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Further, many examples are described in terms of sequences of actions to be performed by, for example, elements of a computing device. It will be recognized that various actions described herein can be performed by specific circuits (e.g., application specific integrated circuits (ASICs) or SoCs), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

In this description, certain terminology is used to describe certain features. The term "mobile device" can describe, and is not limited to, a mobile phone, a mobile communication device, a pager, a personal digital assistant, a personal information manager, a mobile hand-held computer, a laptop computer, a wireless device, a wireless modem, and/or other types of portable electronic devices typically carried by a person and/or having communication capabilities (e.g., wireless, cellular, infrared, short-range radio, etc.).

FIG. 1 depicts a power management system according to some examples of the disclosure. As shown in FIG. 1, a power management system 400 may include a processor unit 410, a power manager unit 420, a memory management unit 430, a non-volatile memory 440, and a volatile memory 450. The aforementioned components may all be part of a SoC or individual components located locally or remote from each other. The power management system 400 may include a power supply 460 and a clock signal 470. The power supply 460 may be coupled to each component to power that components function. Additionally, a power switch 461 may be included in line with the power supply to the processor 410 and a power switch 462 may be included in line with the volatile memory 450. The power switches 461 and 462 may be coupled to or controlled by the power manager unit 420 to enable the power manager unit 420 to reduce or switch off the power to all or a portion of the processor 410 or volatile memory 450. Additionally, a clock switch 471 may be included in line with the power supply to the processor 410 and a clock switch 472 may be included in line with the volatile memory 450. The clock switches 471 and 472 may be coupled to or controlled by the power manager 420 to enable the power manager 420 to reduce or switch off the clock signal to all or a portion of the processor 410 or volatile memory 450.

The processor unit 410 may be a microcontroller, microprocessor, or silicon processing node suitable to run software. As a new software thread is initiated by the processor 410, the processor 410 sends a signal or command to the MMU 430 to allocate memory for the software thread. The memory allocation may include allocating a portion of non-volatile memory 440 and a portion of volatile memory 450. The non-volatile memory 440 may be a MRAM not susceptible to appreciable transistor leak or retention current and the volatile memory 450 may be a SRAM that is susceptible to appreciable transistor leak or retention current. As part of the memory allocation, the power manager may allow power and/or a clock signal to the processor 410 running the software thread and/or the volatile memory 450 allocated to that particular software thread. The memory allocation may assign the non-volatile memory logically above (a logically higher memory address in the stack memory) the volatile memory in the memory stack even though the different memory regions are not contiguous so that it appears to the processor 410 the memory is contiguous. The non-volatile memory assigned to the software thread may include enough memory to include the voting function commands or status as well as any other operation or data that is desired to remain operational during a power collapse status. As the software thread performs a function, the MMU may assign additional volatile memory as necessary.

When the software thread has completed its function or determines it no longer needs the associated volatile memory region assigned to that software thread, the software thread may issue a power collapse vote. Once the power collapse vote has been issued, the processor 410 may send a signal or command to the power manager 420 to initiate a power collapse of the volatile memory region assigned to that software thread. It should be understood that if other software threads are utilizing the same volatile memory region, all the software threads associated with a particular volatile region may be required to vote for a power collapse before the power collapse command is initiated by the processor 410 or, alternatively, the power manager 420. This may be accomplished by a polling operation of the processor 410, power manager 420, MMU 430, or a separate polling entity/component 431. Alternatively, this may be accomplished by an interrupt operation of the processor 410, power manager 420, MMU 430, or a separate interrupt entity/component 432. In addition, the power collapse may instead be by a memory compression operation that reduces the power required by the relevant volatile memory region.

Figure 2:
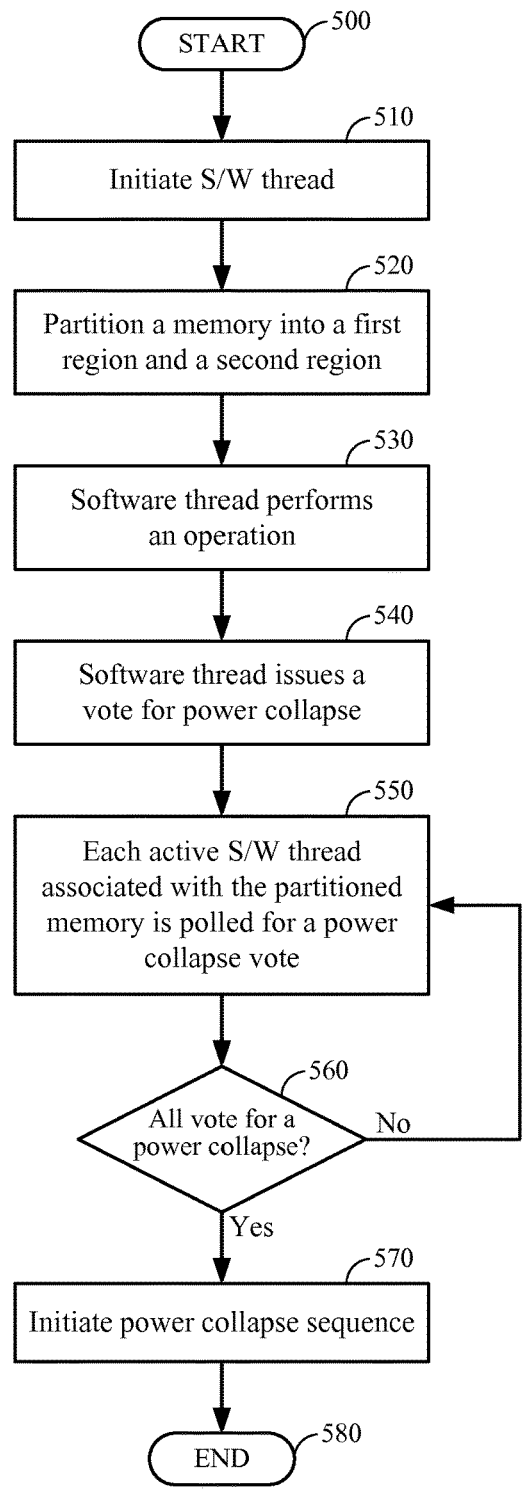
FIG. 2 illustrates an exemplary flow chart for a power management system according to some examples of the disclosure.

FIG. 2 depicts an exemplary flow chart for a power management system according to some examples of the disclosure. As shown in FIG. 2, the power management system is powered on or initialized in 500. In 510, a software thread is initiated. In 520, a memory region is partitioned into a first region and a second region. The first region may be a portion of a non-volatile memory assigned logically above the second region that may be a portion of a volatile memory and the first and second regions may appear to the power management system as a contiguous memory region. In 530, the software thread performs a logic operation or a function. In 540, the software thread issues a power down or collapse vote. In 550, a polling entity polls each active software thread associated with the partitioned memory for a power collapse vote. In 560, if each software thread votes for a power collapse, the process continues to 570 or returns to 550 to periodically poll each relevant software thread. In 570, a power collapse sequence is initiated. The power collapse sequence may power down the second region of volatile memory associated with the software thread. Alternatively, the power collapse sequence may compress the second region of the volatile memory associated with the software thread instead of completely powered down. In 580, the process ends. At process end, the partitioned memory may be released if the software thread is completed or the partitioned memory may remain allocated to the software thread for later use.

Figure 3:
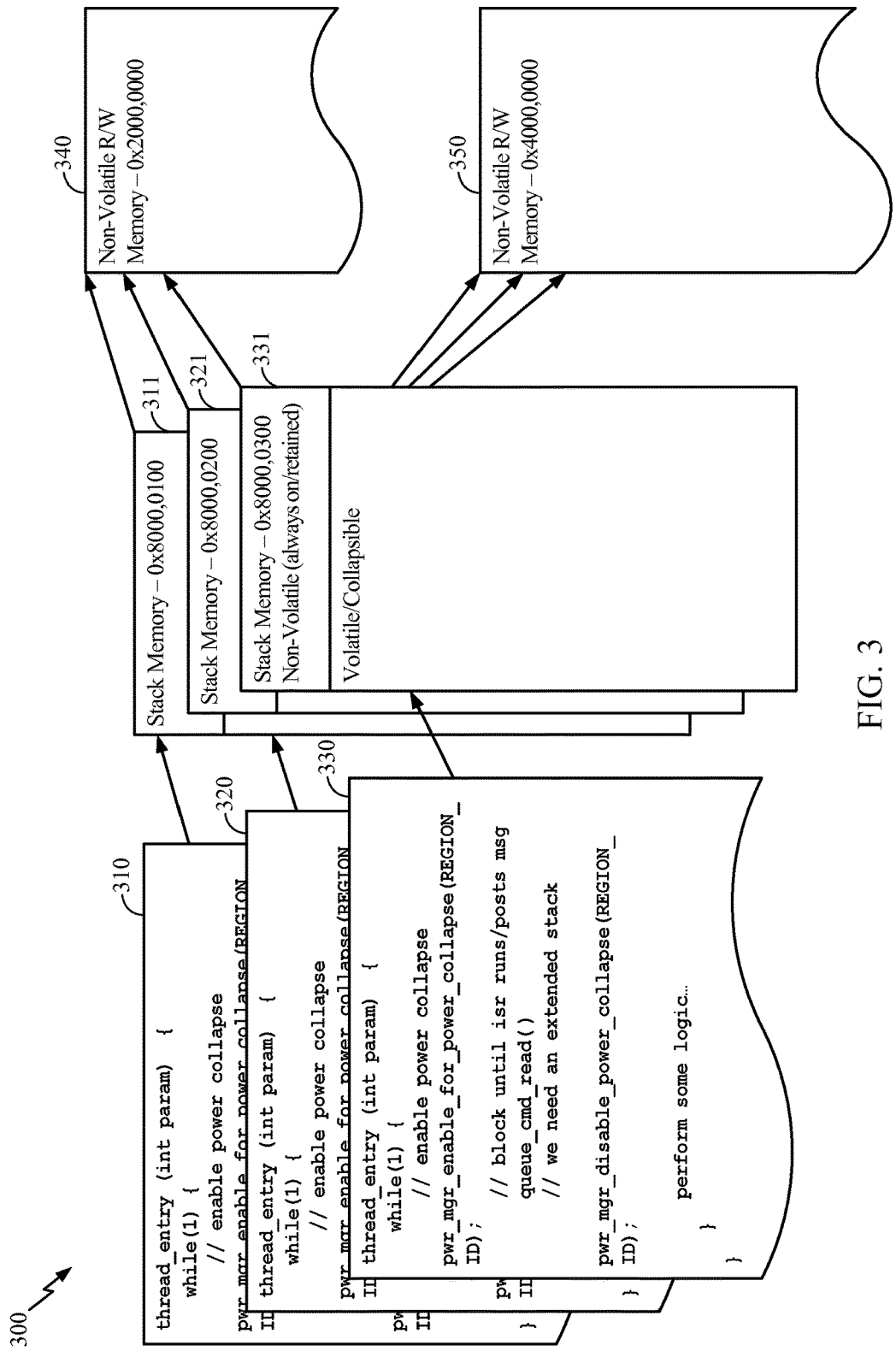
FIG. 3 illustrates an exemplary software thread and associated stack memory in accordance with some examples of the disclosure.

FIG. 3 depicts software threads and associated memory stacks for a power management system according to some examples of the disclosure. Software typically uses several areas of memory for specific purposes. This disclosure focuses on allowing memory associated with software threads (or other memory) to be power collapsed (power down). As shown in FIG. 3, a memory arrangement 300 resulting from application of a power management system, such as power management system 400, may include a plurality of software threads 310, 320, and 330. Each thread may have an associated memory stack 311, 321, and 331. The memory stacks 311, 321, and 331 are assigned or allocated to a software thread once the thread is initialized. These memory stacks 311, 321, and 331 may be memory regions allocated to a particular software thread for storing data and performing logical functions. Each memory stack 311, 321, and 331 may include two separate memory regions, a non-volatile region and a volatile region. As shown in FIG. 3, each memory stack 311, 321, and 331 may share the same physical non-volatile memory region 340 and volatile memory region 350 that are logically partitioned to be associated with a specific software thread 310, 320, or 330. It should be understood that each memory stack may also be assigned to physically separate non-volatile and volatile memory regions or a combination of physically and logically separate memory regions.

In some examples of the disclosure, the memory arrangement 300 may include a hardware block, such as memory management unit (MMU) 430 (shown in FIG. 1), for memory management and a memory region that presents a linear piece of memory to the system. It should be understood that the MMU may be integrated into a central processing unit (CPU), may be separate from the CPU, or may be a custom logic circuit outside the processor instead of a conventional MMU. The memory region includes a memory region that isn't power collapsible and a memory region that is power collapsible. The memory region that is not power collapsed may be a non-volatile byte accessible read/write memory at a logical top of the memory stack, such as a magnetoresistive random-access memory (MRAM), and the collapsible memory region may be a volatile byte accessible read/write memory logically below the non-volatile memory, such as a static random-access memory (SRAM). The system also may include a thread task responsible for issuing/maintaining votes, such as polling entity 431. For instance, a number of thread tasks with a top level loop that performs voting for/against power collapse. When a stack frame of the memory stack returns to its upper point (+ overhead for voting), a vote for power collapse may be initiated. The stack frame for this thread task may be spread across the non-power collapsed memory and the memory that is to be power-collapsed. During the normal execution of the software as thread tasks are created/started and assigned memory for their respective stacks, the memory assigned may be taken from a combination of memory that isn't power collapsed and memory that is to be collapsed (see FIG. 3, for example). The non-linearity of separate address ranges for these two pieces of memory may be handled by a separate hardware block, such as a MMU (not shown in FIG. 3).

Each thread task 310, 320, and 330 may request a vote from a power manager, such as power manager 420 (shown in FIG. 1) responsible for performing the power collapse. A normalizing operation of the thread task (receipt of messages/semaphores etc.) causes the top level loop to perform processing. As soon as this occurs a vote may be made against performing power collapse (resulting in no power collapse or bringing the memory out of the power collapsed state). The stack frame may then grow into the memory that was power collapsed (via the remapping feature of the hardware block) until all the subsequent processing has been performed whereby the stack frame is then unwound back up to the top of the thread task loop where it remains in an idle state having issued a vote for power collapse. When all the votes associated with a particular memory indicate it is ok to power collapse, the memory may be collapsed to save power. As soon as one entity requires use of the memory, it is brought out of collapse to allow use by the any thread task that requires it.

The power collapse may be accomplished by removing power from the relevant volatile memory region (e.g. a power manager switching off power), removing a clock signal from the relevant volatile memory region, re-assigning the relevant volatile memory region to another thread task, removing power from the processor (not shown) accessing the relevant volatile memory region, removing a clock signal from the processor accessing the relevant volatile memory region, or compressing the relevant volatile memory region so that less power is used by the region. It should be noted that when performing the logic to map a virtual region from one or more physical regions, a large set of comparators that would be exercised on every bus access and would require power. As an alternative to lessen the power penalty, the same power down effect could be achieved by copying the regions from non-volatile memory to volatile memory for access, and then when powering down, performing a copy from volatile memory back to non-volatile memory.

Figure 4:
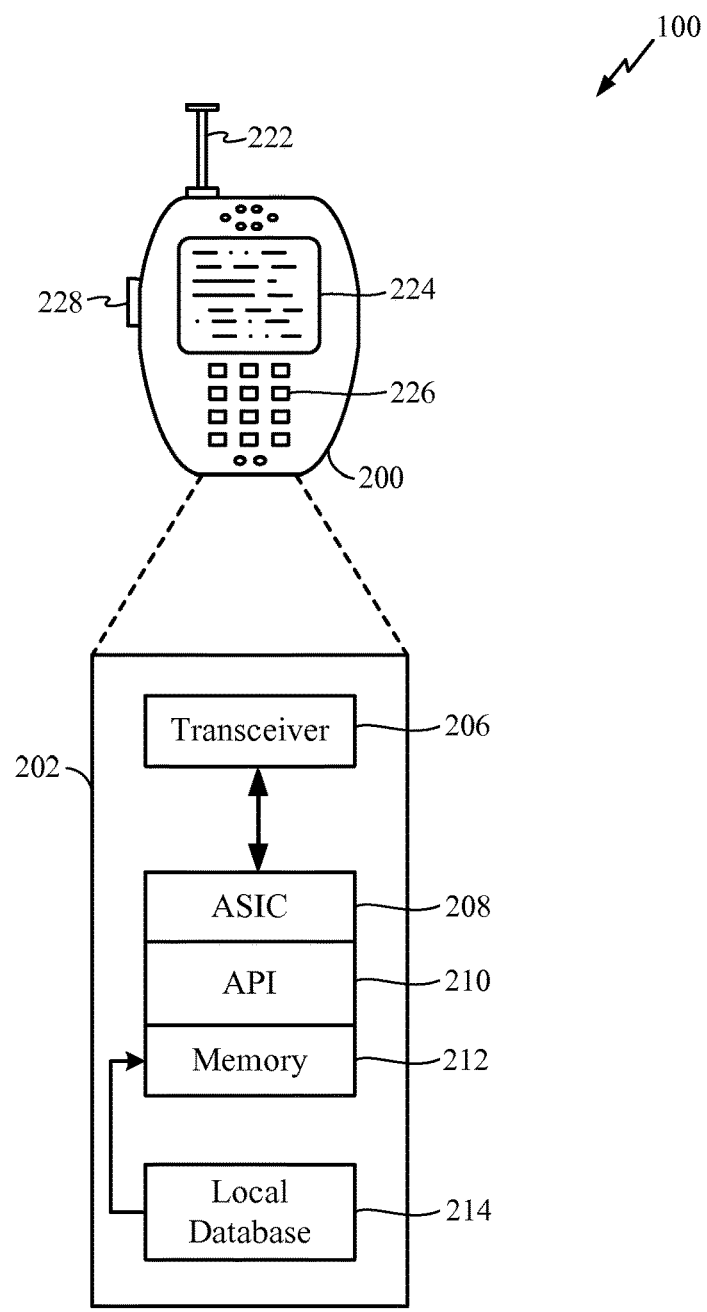
FIG. 4 illustrates an exemplary mobile device in accordance with some examples of the disclosure.

Referring to FIG. 4, a system 100 that includes a mobile device 200, (here a wireless device), such as a cellular telephone, which has a platform 202 that can receive and execute software applications, data and/or commands transmitted from a radio access network (RAN) that may ultimately come from a core network, the Internet and/or other remote servers and networks. Platform 202 can include transceiver 206 operably coupled to an application specific integrated circuit ("ASIC" 208), SoC, or other processor, microprocessor, logic circuit, or other data processing device such as power management system 400 shown in FIG. 1. The processor, for example processor 410, may be implemented as ASIC 208 or an SoC that executes the application programming interface ("API") 210 layer that interfaces with any resident programs in memory 212 of the wireless device. Memory 212 can be comprised of read-only or random-access memory (RAM and ROM), EEPROM, flash cards, or any memory common to computer platforms including the volatile and non-volatile memory such as memory 440 and 450 shown in FIG. 1. Platform 202 also can include local database 214 that can hold applications not actively used in memory 212. Alternatively, non-active applications may be stored in static RAM or long term storage. Local database 214 is typically a flash memory cell, but can be any secondary storage device as known in the art, such as magnetic media, EEPROM, optical media, tape, soft or hard disk, or the like. Internal platform 202 components can also be operably coupled to external devices such as antenna 222, display 224, push-to-talk button 228 and keypad 226 among other components, as is known in the art.

Accordingly, an example of the disclosure may include a mobile device including the ability to perform the functions described herein. As will be appreciated by those skilled in the art, the various logic elements can be embodied in discrete elements, software modules executed on a processor or any combination of software and hardware to achieve the functionality disclosed herein. For example, SoC or ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of mobile device 200 in FIG. 4 are to be considered merely illustrative and the disclosure is not limited to the illustrated features or arrangement.

The wireless communication between mobile device 200 and the RAN can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE) or other protocols that may be used in a wireless communications network or a data communications network. Accordingly, the illustrations provided herein are not intended to limit the examples of the disclosure and are merely to aid in the description of aspects of examples of the disclosure.

Figure 5:
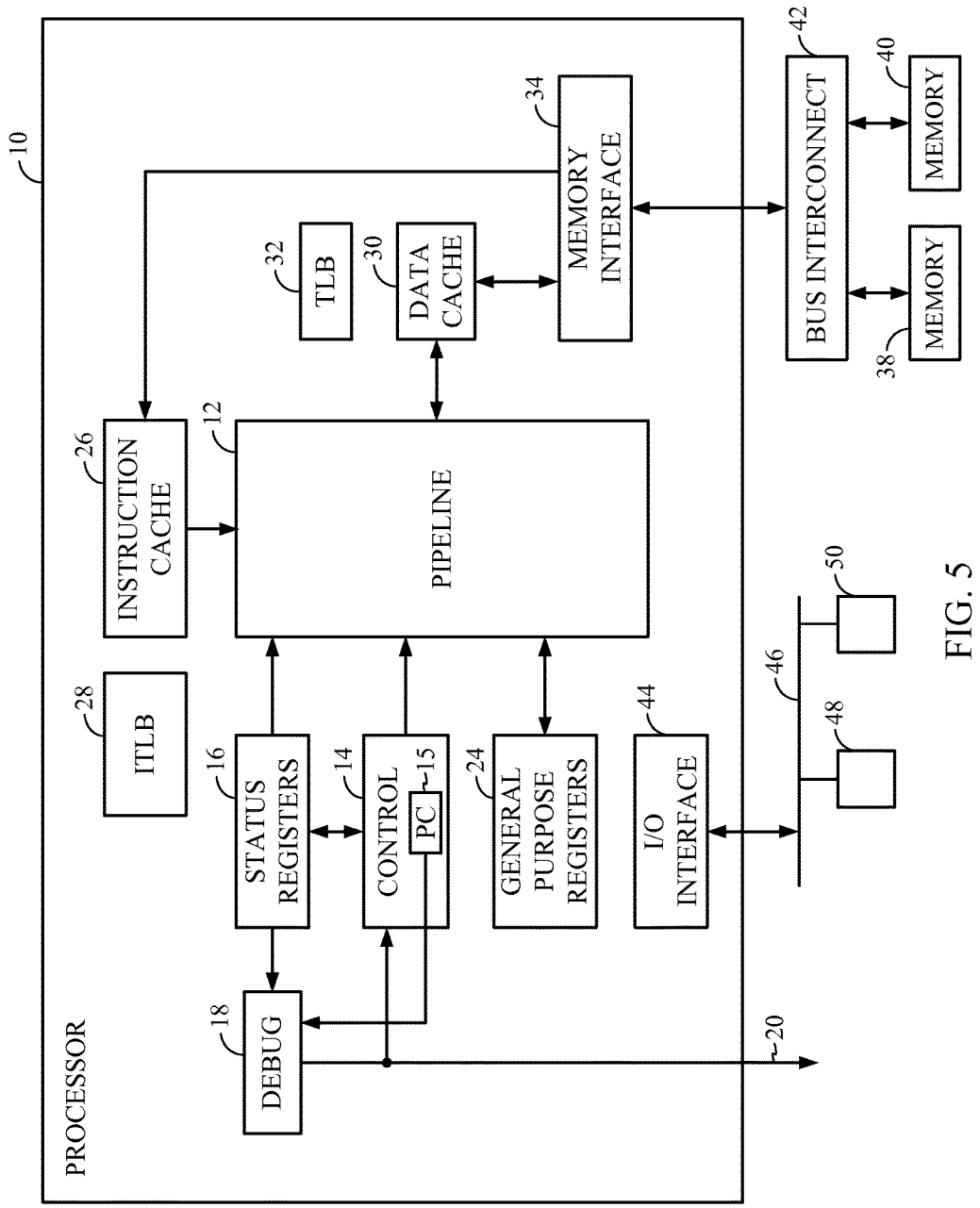
FIG. 5 illustrates an exemplary processor in accordance with some examples of the disclosure.

FIG. 5 depicts a functional block diagram of an exemplary processor 10 as implemented in an ASIC or SoC 208 configured to incorporate features of a power management system. Processor 10 executes instructions in an instruction execution pipeline 12 according to control logic 14. Control logic 14 maintains a Program Counter (PC) 15, and sets and clears bits in one or more status registers 16 to indicate, e.g., the current instruction set operating mode, information regarding the results of arithmetic operations and logical comparisons (zero, carry, equal, not equal), and the like. In some examples, pipeline 12 may be a superscalar design, with multiple, parallel pipelines. Pipeline 12 may also be referred to as an execution unit. A General Purpose Register (GPR) list 20 provides a list of general purpose registers 24 accessible by pipeline 12, and comprising the top of the memory hierarchy.

Processor 10 may additionally include a debug circuit 18, operative to compare, upon the execution of each instruction, at least a predetermined target instruction set operating mode to the current instruction set operating mode, and to provide an indication of a match between the two.

Pipeline 12 fetches instructions from an instruction cache (I-cache) 26, with memory address translation and permissions managed by an Instruction-side Translation Lookaside Buffer (ITLB) 28. Data is accessed from a data cache (D-cache) 30, with memory address translation and permissions managed by a main Translation Lookaside Buffer (TLB) 32. In various examples, ITLB 28 may comprise a copy of part of TLB 32. Alternatively, ITLB 28 and TLB 32 may be integrated. Similarly, in various examples of processor 10, I-cache 26 and D-cache 30 may be integrated, or unified. Further, I-cache 26 and D-cache 30 may be L1 caches. Misses in I-cache 26 and/or D-cache 30 cause an access to main (off-chip) memory 38, 40 by a memory interface 34. Memory interface 34 may be a master input to a bus interconnect 42 implementing a shared bus to one or more memory devices 38, 40 in accordance with some examples of the disclosure. Additional master devices (not shown) may additionally connect to bus interconnect 42.

Processor 10 may include input/output (I/O) interface 44, which may be a master device on a peripheral bus, across which I/O interface 44 may access various peripheral devices 48, 50 via bus 46. Those of skill in the art will recognize that numerous variations of processor 10 are possible. For example, processor 10 may include a second-level (L2) cache for either or both I and D caches 26, 30. In addition, one or more of the functional blocks depicted in processor 10 may be omitted from a particular example. Other functional blocks that may reside in processor 10, such as a JTAG controller, instruction pre-decoder, branch target address cache, and the like are not germane to a description of the present disclosure, and are omitted for clarity.

Examples of the methods, apparatus, and systems described herein can be used in a number of different applications. For instance, the described examples could be used in low power mobile phone, a smart watch, or other low power applications where reducing unnecessary power consumption is important. Further applications should be readily apparent to those of ordinary skill in the art.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

What is claimed is:

1. A power management system for thread tasks, comprising:
    a stack memory;
    a non-collapsible memory region;
    a collapsible memory region configured to be logically below the non-collapsible memory region in the stack memory, wherein the stack memory comprises at least one of the non-collapsible memory region or the collapsible memory region;
    a memory management unit in communication with the non-collapsible memory region and the collapsible memory region, the memory management unit operable to allocate a portion of the non-collapsible memory region and a portion of the collapsible memory region to a first thread upon initialization of a thread task, and wherein the first thread is configurable to issue a power down request upon completion of the thread task;
    a polling entity configured to poll a second thread associated with the portion of the collapsible memory region allocated to the first thread to issue a power down vote upon receipt of the power down request; and
    wherein the memory management unit is operable to power down the portion of the collapsible memory region allocated to the first thread upon receiving a power down vote from the second thread.

2. The power management system of claim 1, wherein the polling entity is in communication with the memory management unit, the non-collapsible memory region is a first random access memory, and the collapsible memory region is a second random access memory.

3. The power management system of claim 2, wherein the polling entity sends the power down request to the memory management unit when the thread task is complete.

4. The power management system of claim 3, wherein the polling entity sends the power down command to the memory management unit when all thread tasks associated with the collapsible memory region are complete.

5. The power management system of claim 1, wherein the non-collapsible memory region is a read write accessible non-volatile memory and the collapsible memory region is a read write accessible volatile memory.

6. The power management system of claim 5, further comprising copying the non-collapsible memory region to the collapsible memory region for access and wherein the power down comprises performing a copy from the collapsible memory region to the non-collapsible memory region.

7. The power management system of claim 1, wherein the power down comprises compressing the collapsible memory region allocated to the first thread.

8. The power management system of claim 1, further comprising a switch in communication with the memory management unit, the switch being operable to switch off a power signal or a clock signal to the collapsible memory region upon receiving a power down command from the memory management unit.

9. The power management system of claim 1, wherein the non-collapsible memory region, the collapsible memory region, and the memory management unit are incorporated into a device selected from the group consisting of a set top box, a music player, a video player, an entertainment unit, a navigation device, a communications device, a personal digital assistant (PDA), a fixed location data unit, and a computer.

10. The power management system of claim 1, further comprising an interrupt entity in communication with the memory management unit, the interrupt entity operable to query the first thread to determine if the thread task is complete.

11. The power management system of claim 10, wherein the interrupt entity sends the power down command to the memory management unit when the thread task is complete.

12. The power management system of claim 11, wherein the interrupt entity sends the power down command to the memory management unit when all thread tasks associated with the collapsible memory region are complete.

13. A method of powering down a memory, comprising: partitioning a memory into a first region and a second region, the second region being a stack memory with associated threads and configured to be logically below the first region in the stack memory;

allocating a portion of the first region and a portion of the second region to a first thread upon initialization of a thread task;

receiving a power down request upon completion of the thread task; and upon receiving the power down request, maintaining power to the first region and polling a power down vote from each of the associated threads to determine if the second region associated with a thread should be powered down or maintained.

14. The method of claim 13, wherein each stack memory includes a non-volatile region of a first random access memory and a volatile region of a second random access memory and wherein the non-volatile region remains active and the volatile region is powered down.

15. The method of claim 14, wherein data in a powered down region is compressed instead of completely powered down.

16. The method of claim 13, wherein powering down the second region includes sending a power down command to a switch that powers the second region to open the switch.

17. The method of claim 13, wherein powering down the second region includes sending a power down command to a switch that inputs a clock signal to the second region to open the switch.

18. A non-transitory computer-readable memory to store instructions that when executed on a system cause the system to perform a process, the process comprising:

partitioning a memory into a first region and a second region, the second region being a stack memory with associated threads and configured to be logically below the first region in the stack memory;

allocating a portion of the first region and a portion of the second region to a first thread upon initialization of a thread task;

receiving a power down request upon completion of the thread task; and upon receiving the power down request, maintaining power to the first region and polling a power down vote from each of the associated threads to determine if the second region associated with a thread should be powered down or maintained.

19. The non-transitory computer-readable memory of claim 18, wherein each stack memory includes a non-volatile region of a first random access memory and a volatile region of a second random access memory and wherein the non-volatile region remains active and the volatile region is powered down.

20. The non-transitory computer-readable memory of claim 19, wherein data in a powered down region is compressed instead of completely powered down.

* * * * *